3,290,316
α-3-PYRIDYLMANDELIC ACID AND
DERIVATIVES THEREOF
Arthur Stempel, Teaneck, N.J., assignor to Hoffmann-La
Roche Inc., Nutley, N.J., a corporation of New Jersey
No Drawing. Filed Aug. 3, 1962, Ser. No. 214,498
15 Claims. (Cl. 260—292)

This invention relates, in general, to α-3-pyridylmandelic acid and to therapeutically active derivatives thereof. Additionally, the invention relates to a process for producing α-3-pyridylmandelic acid.

In its most comprehensive embodiment, the present invention is concerned with α-3-pyridylmandelic acid, a new and highly useful compound.

In another of its comprehensive embodiments, the invention is concerned with esters of α-3-pyridylmandelic acid, compounds which have been found to possess valuable therapeutic activity.

In a more restrictive embodiment, the invention is concerned with a process for producing α-3-pyridylmandelic acid.

Broadly speaking, the compounds of this invention are selected from the group consisting of α-3-pyridylmandelic acid, a compound having the formula:

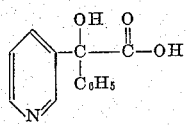

esters of said α-3-pyridylmandelic acid and acid addition salts of such esters with medicinally acceptable acids.

The preferred esters of this invention are compounds having the formula:

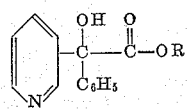

in which R is an alkyl group; a halogenated alkyl group; a dialkylaminoalkyl group; an alkyltrialkylammonium halide group; or a nitrogen-containing heterocyclic group.

The alkyl groups which, in Formula II, are represented by the symbol R include, for example, lower alkyl groups, such as methyl, ethyl, propyl, butyl, etc., groups. The halogenated alkyl groups which, in Formula II, are represented by the symbol R include, for example, bromomethyl, chloromethyl, bromoethyl, etc., groups. The dialkylaminoalkyl groups which, in Formula II, are represented by the symbol R include, for example, dimethylaminoethyl, diethylaminoethyl, etc., groups. The alkyl trialkylammonium halide groups which, in Formula II, are represented by the symbol R include, for example, an ethyl trimethylammonium halide group. Finally, the nitrogen-containing heterocyclic groups which, in Formula II, are represented by the symbol R include, for example, quinuclidinyl, tropyl, hydroxy pyridyl, hydroxy piperidyl, etc., groups.

Acid addition salts formed by reaction of the aforementioned esters with medicinally acceptable acids are also within the scope of this invention. Such salts are prepared, for example, for reacting the ester with a medicinally acceptable inorganic acid such as hydrochloric acid, sulfuric acid, nitric acid, etc., or with a medicinally acceptable organic acid such as acetic acid, citric acid, oxalic acid, tartaric acid, etc.

It has been found that esters of α-3-pyridylmandelic acid, as well as the acid addition salts of such esters, have outstanding spasmolytic properties. At the same time, these compounds exhibit little, if any, central stimulatory activity.

In the practice of this invention, α-3-pyridylmandelic acid is prepared by the oxidation of 3-pyridylbenzyl ketone with selenium dioxide and the subsequent rearrangement of the oxidation product, namely, 1-phenyl-2-(3-pyridyl)-glyoxal, with alkali. The 3-pyridylbenzyl ketone which is used as the starting material is a known compound. In the oxidation step, 3-pyridylbenzyl ketone is first dissolved in a suitable inert solvent. Acetic acid is preferably used as the solvent, but, however, other inert solvents such as dioxane are fully suitable for use. The quantity of solvent used in this step of the process is not particularly critical. Preferably, however, the starting ketone will be dissolved in from about 5 to about 15 times its weight of solvent. The solution which is thus obtained is charged into a suitable reaction vessel and, subsequently, selenium dioxide is added thereto. In carrying out the process, approximately equimolar quantities of 3-pyridylbenzyl ketone and selenium dioxide are used. However, an excess amount of selenium dioxide can be employed, if desired. The reaction mixture is thereafter heated at a temperature up to about the reflux temperature thereof. The mixture is heated and continuously stirred until the oxidation reaction has proceeded to completion. When the reaction is complete, the selenium formed is removed from the reaction mixture by filtration and the filtrate is concentrated to dryness in vacuo. The product, thus obtained, namely, 1-phenyl-2-(3-pyridyl)-glyoxal, is a new compound and it is obtained from the residue by distillation. This compound may be recrystallized from hexane or some other suitable solvent.

The desired α-3-pyridylmandelic acid is, thereafter, obtained by the rearrangement of 1-phenyl-2-(3-pyridyl)-glyoxal with alkali. The rearrangement is accomplished as follows: 1-phenyl-2-(3-pyridyl)-glyoxal is dissolved in a dilute alkali, as, for example, in an alkali metal hydroxide such as sodium hydroxide, and the solution, thus obtained, is heated to an elevated temperature. In the preferred embodiment of the invention, the reaction mixture is heated at a temperature within the range of from about 90° to 95° C. and it is maintained at such temperature until rearrangement is complete. Under ordinary circumstances, heating for a period of at least about two hours will suffice to bring about the desired rearrangement. At the end of the heating period, the reaction mixture is cooled to about room temperature, acidified using a concentrated mineral acid, as, for example, concentrated hydrochloric acid, and, subsequently, concentrated to dryness in vacuo. After drying by conventional means, for example, by stirring with a mixture of alcohol and benzene and subsequent removal of the solvents, the solid residue is extracted several times using a suitable solvent. Low molecular weight monohydric aliphatic alcohols, as, for example, ethanol, have been found to be well suited for use as the extracting solvents. The solvent extracts which are obtained are combined and evaporated to a thick syrup. This syrup is thereafter redissolved in a suitable solvent. Methanol is the solvent preferably used, although other low molecular weight monohydric aliphatic alcohols can be employed. Thereafter, a base such as triethylamine is added to, and stirred, in the solvent solution. Crystallization of α-3-pyridylmandelic acid from this solution can be induced either by seeding or scratching. Following crystallization, the acid can, if desired, be recrystallized from alcohol, for example, methanol, or from a mixture of acetic acid and benzene.

α-3-pyridylmandelic acid, produced by the method described herein, is used as the starting material from which the therapeutically active ester derivatives of this invention are obtained. In general, esters of a α-3-pyridylmandelic acid can be prepared by any conventional esterification method. For example, the desired esters can be produced using the well known ester interchange method. An alkaline catalyst is preferably employed when the novel esters of this invention are produced by that method. Additionally, however, the therapeutically active esters of this invention can be prepared, for example, by the reaction of a salt of α-3-pyridylmandelic acid with an alkyl halide or a substituted alkyl halide. As an example of this method, the production of the dialkylaminoalkyl ester of 3-pyridylmandelic acid by the reaction of a sodium salt of 3-pyridylmandelic acid with a dialkylaminoalkyl halide may be mentioned. The examples which follow hereinafter will demonstrate in full detail the manner in which the esters of this invention are produced.

For a fuller understanding of the nature and objects of this invention, reference may be had to the following examples which are given merely as further illustration of the invention and are not to be construed in a limiting sense.

*Example 1*

777 grams of 3-pyridylbenzyl ketone (3.95 moles) were dissolved in 8 liters of acetic acid and this solution was passed into a vessel equipped with an efficient stirrer and a reflux condenser. Thereafter, 440 grams of selenium dioxide (4.0 moles) was charged into this vessel. The mixture was heated to reflux with constant stirring. After about 15 minutes at reflux temperature, a mirror formed on the walls of the flask and a black precipitate soon separated from solution. A hard cake then formed and heating and stirring were discontinued. Subsequently, this cake was broken up into relatively small pieces and heating and stirring were resumed. After about 6 hours, the reaction was complete and the acetic acid solution was filtered to remove the selenium present therein. Thereafter, the filtrate was concentrated to dryness in vacuo. The residue, thus obtained, was then distilled and a white solid was observed to form in the forerun. 1-phenyl-2-(3-pyridyl)-glyoxal was isolated as a yellow oil which distilled at a temperature of 145°–150° C./1.0 mm. The compound was then recrystallized from hexane. The compound melted at 55°–57° C.

651 grams of the 1-phenyl-2-(3-pyridyl)-glyoxal was dissolved in 13 liters of 10% aqueous sodium hydroxide solution and heated to a temperature of from about 90°–95° C. for a period of about two hours. At the end of this time the solution was cooled to room temperature and acidified with 3.2 liters of concentrated hydrochloric acid. The acidified solution was subsequently concentrated to dryness in vacuo. The residue, thus obtained, was dried by stirring with 3 liters of anhydrous ethanol and 500 cc. of benzene. Thereafter, the product was taken once again to dryness in vacuo. The solid residue was then extracted 3 times, using 4 liters, 4 liters and 2 liters of hot ethanol, respectively. The combined ethanol extracts were then concentrated in vacuo to a thick syrup and the syrup was subsequently dissolved in 3 liters of methanol. Thereafter, 312 grams (430 cc.) of triethylamine were added to the methanol solution. Crystallization of α-3-pyridylmandelic acid took place on scratching the side of the vessel. The product, melting at 157°–158° C., with decomposition, was obtained. Recrystallization of a portion of the acid from methanol and of another portion from a mixture of acetic acid and benzene yielded a product melting at 165°–166° C.

*Example 2*

In this example, 22.0 g. of α-3-pyridylmandelic acid were suspended in 400 cc. of methanol. The suspension was cooled in an ice bath and 35 cc. of concentrated sulfuric acid were added thereto slowly. During the addition of the sulfuric acid, the temperature of the suspension was maintained at below about 20° C. After the addition of sulfuric acid was complete, the reaction mixture was heated at reflux temperature for a period of about two hours and subsequently concentrated to a small volume in vacuo, while maintaining the bath temperature below 40° C. A syrupy residue was thus obtained. This residue was poured into a mixture of ice and water. The aqueous mixture was made slightly alkaline using cold ammonia, following which the mixture was extracted with chloroform. After drying over sodium sulfate, the chloroform layer was taken to dryness in vacuo. The residue which remained was crystallized from a mixture of benzene and hexane. The product, thus obtained, was methyl α-3-pyridylmandelate melting at 90°–91° C.

*Example 3*

In this example, 2.4 g. of sodium methoxide were first dissolved in 250 cc. of methanol. Thereafter, 10.0 g. (0.0436 mole) of α-3-pyridylmandelic acid were added thereto. The mixture was then heated until all of the α-3-pyridylmandelic acid, in the form of its sodium salt, had dissolved in the solution. The methanol was then removed by distillation in vacuo and the residue thus obtained was suspended in 250 cc. of isopropanol. Thereafter 6.0 g. (0.0445 mole) of β-diethylaminoethyl chloride was added to the reaction mixture. The reaction mixture was then stirred and heated at its reflux temperature for a period of about two hours. The solvent was removed once again by distillation in vacuo and the residue was dissolved in chloroform. The chloroform solution was then washed using dilute sodium carbonate and water, following which it was dried over sodium sulfate. Upon removal of the solvent by distillation in vacuo, there was obtained a residue which was then dissolved in 50 cc. of ethanol and 5 cc. of 9 N hydrogen chloride in ethanol. To the solution of the hydrochloride, 50 cc. of acetone were added followed by the addition of 120 cc. of anhydrous ether. β-diethylaminoethyl-α-3-pyridylmandelate dihydrochloride was crystallized from this solution. This product melted at 164–166° C., with decomposition. Recrystallization from a mixture of acetonitrile and ether yielded the product melting at 168–170° C., with decomposition.

*Example 4*

In this example, sodium sand was first prepared from 1.0 g. of sodium in 250 cc. of toluene. After cooling, 10.0 g. of methyl-α-3-pyridylmandelate, prepared as described in Example 2, were added to this solution. When the reaction between the hydroxy ester and the sodium was complete, 15.0 g. of diethylaminoethanol were added thereto. The reaction mixture was then heated to boiling, and the lower boiling material present in the mixture was slowly distilled off through a 10 inch column, packed with glass helices, until the temperature of the distillate reached 110° C. Heating of the reaction mixture at this reflux temperature was thereafter continued for an additional 30 minutes. The solution, deep red in color when hot, lightened considerably when cooled. The solution when cool was diluted with benzene and washed thoroughly with water. After drying over sodium sulfate, the solvent was removed in vacuo leaving as a residue a light red colored oil. This residue was reacted with hydrochloric acid in ethanol to form β-diethylaminoethyl-α-3-pyridylmandelate dihydrochloride. The latter compound was crystallized from the solution upon addition of acetone and ether thereto. The compound melted at 168–170° C., with decomposition.

*Example 5*

In this example, a suspension of 1.0 g. of sodium sand in 250 cc. of toluene was first prepared. This solution was cooled to below room temperature and 10.0 g. of methyl-α-3-pyridylmandelate were added thereto. After the reaction with sodium was substantially complete, the mixture was warmed to a temperature of about 90° C. and 10.5 g. of quinuclidinol was added. This mixture was then heated to boiling, and the lower boiling fraction was removed through a 10 inch column packed with glass helices. Thereafter the mixture was cooled to about room temperature and filtered. The filtrate was diluted with benzene and washed thoroughly with water. After drying over sodium sulfate, the solvent was removed by distillation in vacuo. The residue, thus obtained, was dissolved in 150 cc. of benzene and 50 cc. of hexane, following which the solution was passed through a column containing 75.0 g. of alumina. The effluent, after removal of the solvent, was crystallized from ethyl acetate to yield the quinuclidinol ester of α-3-pyridylmandelic acid melting at 158–162° C. Recrystallization of the product from ethyl acetate yielded a compound melting at 169–171° C.

*Example 6*

A suspension of 20 g. of α-3-pyridylmandelic acid in 250 cc. of ethylene bromohydrin was cooled in an ice bath and 20 cc. of concentrated sulfuric acid was added slowly thereto. During the addition of the sulfuric acid, the temperature of the reaction mixture was maintained at below about 10° C. When the addition of the acid was complete, the reaction mixture was heated on a steam bath for a period of about 2½ hours and cooled. Subsequently, the excess ethylene bromohydrin was removed by distillation in vacuo. The bath temperature was maintained at below about 50° C. during the distillation of the ethylene bromohydrin. The viscous residue which was thus obtained was then poured onto ice, neutralized with sodium carbonate and extracted with chloroform. The chloroform layer was then dried over sodium sulfate and subsequently evaporated to dryness in vacuo at a temperature below about 30° C. Crystallization of the oily residue from a mixture of ethyl acetate and hexane yielded the β-bromoethyl ester of α-3-pyridylmandelic acid melting at 76–78° C.

*Example 7*

In this example, 40.0 g. of the β-bromoethyl ester of α-3-pyridylmandelic acid, obtained by the method described in Example 6, were dissolved in 225 cc. of a 20% solution of triethylamine in acetone in a pressure bottle. This solution was allowed to stand at room temperature for about 2 days. A crystalline product was formed, and this was separated from the solution by filtration. Recrystallization of the product from acetonitrile gave the α-3-pyridylmandelic acid ester of choline bromide melting at 193–194° C.

*Example 8*

In this example, sodium sand was prepared from 2.3 g. of sodium in 500 ml. of toluene. To this, 24.3 g. of methyl-α-3-pyridylmandelate was added, and the mixture was stirred at room temperature until substantially all of the sodium had reacted. The reaction mixture was then warmed to a temperature of about 70° C. and 15 g. of tropine were added thereto. After about 30 seconds, a yellow precipitate formed. The temperature was raised slowly and the lower boiling fraction was removed by distillation. The reaction mixture was refluxed for about 15 minutes and allowed to cool slowly to room temperature. Thereafter, the mixture was diluted with benzene and cautiously with water. The organic solvent layer was washed with ice water, dried over sodium sulfate, filtered and concentrated to dryness in vacuo. Recrystallization of the thus obtained α-3-pyridylmandelic acid ester of tropine from ethyl acetate and hexane gave a product melting at 131°–133° C.

I claim:
1. An ester of α-3-pyridylmandelic acid having the formula:

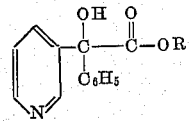

in which R is a member selected from the group consisting of lower alkyl, halogen-substituted lower alkyl, di-lower alkylamino-lower alkyl ethyl trimethylammonium halide and a nitrogen-containing heterocyclic radical selected from the group consisting of quinuclidinyl, 3-tropyl, hydroxy pyridyl and hydroxy piperidyl.
2. α-3-pyridylmandelic acid.
3. The compound of claim 1 wherein R is a lower alkyl group.
4. The compound of claim 1 wherein R is a halogen-substituted lower alkyl group.
5. The compound of claim 1 wherein R is a di-lower alkylamino-lower alkyl group.
6. The compound of claim 1 wherein R is a nitrogen-containing heterocyclic radical selected from the group consisting of quinuclidinyl, 3-tropyl, hydroxy pyridyl and hydroxy piperidyl.
7. Methyl-α-(3-pyridyl)-mandelate.
8. β-diethylaminoethyl-α-(3-pyridyl)-mandelate.
9. Quinuclidinol ester of α-3-pyridylmandelic acid.
10. β-Bromoethyl ester of α-3-pyridylmandelic acid.
11. α-3-pyridylmandelic acid ester of choline bromide.
12. α-3-pyridylmandelic acid ester of tropine.
13. A salt of an ester having the formula:

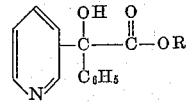

in which R represents a member selected from the group consisting of lower alkyl, halogen-substituted lower alkyl, di-lower alkylamino-lower alkyl, ethyl trimethylammonium halide and a nitrogen-containing heterocyclic radical selected from the group consisting of quinuclidinyl, 3-tropyl, hydroxy pyridyl and hydroxy piperidyl with a medicinally acceptable acid.
14. The compound of claim 13 wherein R is a di-lower alkylamino-lower alkyl group.
15. 1-phenyl-2-(3-pyridyl)-glyoxal.

References Cited by the Examiner

UNITED STATES PATENTS

| | | | |
|---|---|---|---|
| 2,800,476 | 7/1957 | Stoll et al. | 260—292 |
| 2,800,482 | 7/1957 | Zirkle | 260—292 |
| 2,800,483 | 7/1957 | Jucker et al. | 260—292 |
| 3,030,366 | 4/1962 | Biel | 260—295 |
| 3,125,575 | 3/1964 | Biel | 260—295 |
| 3,145,210 | 9/1964 | Archer et al. | 260—292 |

FOREIGN PATENTS 874,015   8/1961   Great Britain.

OTHER REFERENCES

Fieser et al., "Organic Chemistry," 3rd ed., pp. 707–8, Reinhold (1956).
Noller, "Chemistry of Organic Compounds," 2nd ed., pp. 541–2, 767–71 (Saunders) (1957).
Royals, "Advanced Organic Chemistry," Prentice-Hall Pub. Co., 1954, pp. 568–569 and 721–722.

WALTER A. MODANCE, *Primary Examiner.*

JOHN D. RANDOLPH, *Examiner.*

M. W. WESTERN, ROBERT T. BOND,
*Assistant Examiners.*